Nov. 19, 1957 A. A. McCARTHY Re. 24,393

NIGHT LAMP WITH RECEPTACLE

Original Filed Sept. 20, 1954

INVENTOR.

ANTHONY A. McCARTHY

BY

Marechal, Biebel, French & Bugg

ATTORNEYS

United States Patent Office

Re. 24,393
Reissued Nov. 19, 1957

24,393

NIGHT LAMP WITH RECEPTACLE

Anthony A. McCarthy, Dayton, Ohio, assignor, by direct and mesne assignments, to The Nu Nite Lite Co., Dayton, Ohio, a corporation of Ohio Original No. 2,749,428, dated June 5, 1956, Serial No. 457,141, September 20, 1954. Application for reissue July 16, 1957, Serial No. 673,555

4 Claims. (Cl. 240—2)

Matter enclosed in heavy brackets [ ] appears in the original patent but forms no part of this reissue specification; matter printed in italics indicates the additions made by reissue.

This invention relates to an electrical fixture, particularly a night-light adapted to be mounted within a standard electrical receptacle box.

One of the greatest disadvantages of the ordinary type of night-light now in common use is that such a light, when plugged into a wall receptacle, projects outwardly from the surface of the receptacle, and therefore outwardly of the wall, a considerable distance. These lights are commonly held in place only by the two prongs received within the receptacle, and may be easily dislodged with resultant breakage of the light if it falls upon a hard surface, especially since these lights are ordinarily made of relatively brittle plastics which will not withstand the shock of such a fall.

Furthermore, the light may be easily removed and misplaced so that it is not to be found when most needed. For example, if a housewife ordinarily keeps such a light in a child's room and removes it to use the receptacle for other purposes, the light may be mislaid and therefore unavailable late at night when it may become necessary to have a small light in the room.

The present invention provides a combination night-light and receptacle which overcomes these disadvantages by a construction which is designed to replace the ordinary double receptacle and still provide a single receptacle outlet, together with a night-light which is enclosed within the receptacle box and therefore substantially flush with the wall surface. Despite the semi-permanent nature of the installation of the present invention, it is easy to remove and to service, and may be received within any standard electrical receptacle box.

It is therefore an object of this invention to provide a combination night-light and electrical receptacle which may be mounted within any standard receptacle box.

Other objects and advantages of the invention will be apparent from the following description, the accompanying drawing and the appended claims.

In the drawing—

Figure 1:
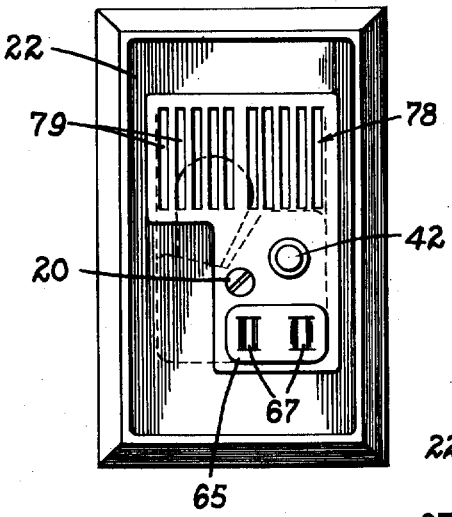
Fig. 1 is an elevational view of the device provided by this invention as it would appear in a normal installation.
Figure 2:
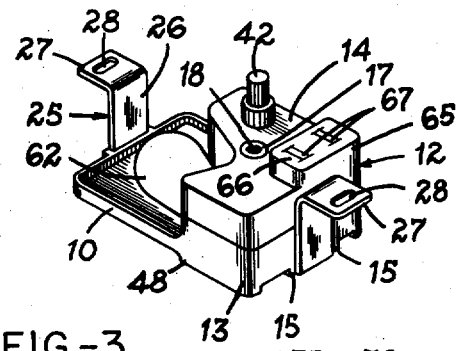
Fig. 2 is a perspective view of the combination night-light and receptacle provided by this invention and shown removed from the receptacle box.
Figure 5:
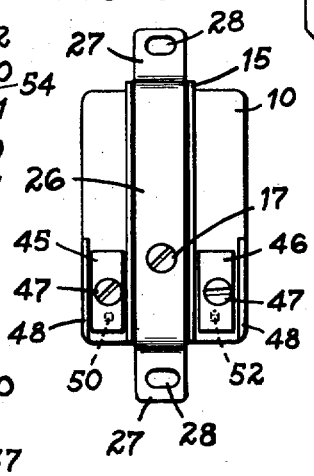
Fig. 5 is a view of the back of the unit of Fig. 2.

Referring to the drawing, which illustrates a preferred embodiment of the invention, and specifically to Fig. 2, there is seen a combination night-light and receptacle having a base 10 with an upstanding boss 12 divided into a lower portion 13 integral with the base and a complementary upper portion 14. The pair of parallel ribs 15 depend from the bottom of base 10 and extend parallel to each other entirely across the base, as seen in Fig. 5. The upper boss portion 14 is fastened to lower boss portion 13 by a bolt 17 threaded at its upper end to upper boss portion 14 and terminating substantially flush with the upper surface thereof. This bolt also has an internal bore 18 at its upper end which is threaded to receive a short screw 20 (Fig. 1) for attaching a cover plate 22 over base 10.

Figure 3:
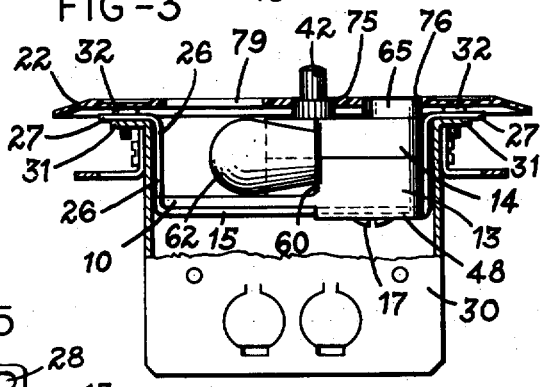
Fig. 3 is a side view, partly in section and partly in elevation, of the device seen in Fig. 1.

A strap 25 having a generally U-shaped center portion 26 and outwardly extending wing portions 27 each slotted at 28 embraces base 10 and boss 12, with the wing portions extending outwardly away from the base and substantially parallel thereto. The base is of such proportions as to be received within any standard electrical receptacle box, for example as seen in Fig. 3 at 30 as including a pair of outwardly disposed wings 31 extending at opposite sides of the open face of the receptacle box and receiving connecting screws 32 which pass through slots 28 in the strap and support the base within box 30. Such receptacle boxes are commonly mounted within a recess in a wall, with their open face substantially flush with the wall to receive electrical receptacles and retain them in substantially flush relationship to the wall.

Figure 4:
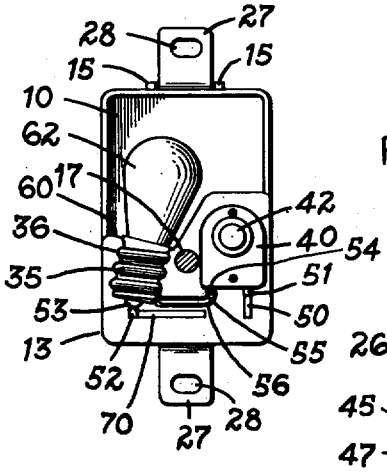
Fig. 4 is an elevational view of the bottom half of the unit seen in Fig. 2.
Figure 6:
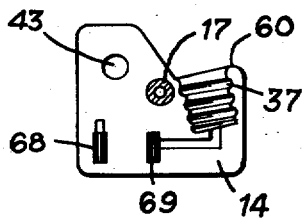
Fig. 6 is a detail view of the upper section of the device as seen in Fig. 2, showing the face thereof complementary to the lower section seen in Fig. 4.

Referring to Fig. 4, wherein the upper boss portion 14 is removed, there is seen a threaded socket 35 which is received between a recess 36 in lower boss portion 13 and a complementary recess 37 (Fig. 6) in upper boss portion 14. Also recessed into lower boss portion 13 is a switch 40, preferably of the single push button type having an upstanding operating shaft 42 which projects through a hole 43 in the upper boss portion when the parts are assembled as in Fig. 2. At the bottom of base 10, outwardly of ribs 15 and preferably below socket 35 and switch 40, are a pair of contacts including strips 45 and 46 which are molded into or otherwise secured at one end to base 10 and each having a screw 47 received therein for engaging the opposite wires of an electrical supply. The rib portions 48 depend from the sides of the base outwardly of strips 45 and 46 to provide protection against knocking the strips loose from the base and for the ends of the electrical wires attached to screws 47.

Switch 40 and socket 35 are wired in series to strips 45 and 46 by a connector bar 50, which is preferably molded into base 10 and attached at one end to one contact 51 of switch 40, and a second connector bar 52 likewise preferably molded into the base and connected at one end to strip 46 and at the other end to the button 53 of socket 35. The other contact 54 of the switch is connected by a short wire 55 lying within a recess 56 in lower boss portion 13 to the outer or screw connection of the socket.

Socket 35 opens on the wall 60 of boss 12 facing the other end of base 10, and a bulb 62 is received within the socket and thus held over the other end of the base beneath cover plate 22 because of the spacer action of boss 12. Lighting of the bulb is controlled by switch 40.

Figure 7:
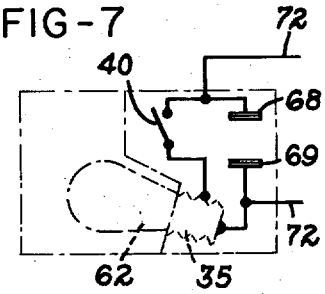
Fig. 7 is a schematic wiring diagram.

At one corner of boss 12, as seen in Fig. 2, is an electrical receptacle 65 having a face portion 66 raised somewhat above the surface of upper boss portion 14 and including a pair of spaced apertures 67 for receiving the prongs of an electrical plug. Within apertures 67 are contact strips 68 and 69 (Fig. 6) for engaging the ends of the plug prongs and connecting them to the electrical supply through contact strips 45 and 46 respectively. In assembly, strip 68 rests upon bar 50 and strip 69 rests upon a bar 70 which is in turn connected to bar 52, thus wiring receptacle 65 in parallel with socket 35 and switch 40. The completed unit is thus wired for a controlled supply of electricity from a source 72 (Fig. 7) and to socket 35 and a continuous supply to receptacle 65.

Plate 22 is provided with a first aperture 75 through which the switch control shaft 42 projects in assembly, this being the only element on the unit which extends outwardly of the plate. A second aperture 76 receives the receptable 65, with the upper face 66 thereof in substantially flush relation with the outer surface of the plate, and the plate also includes a light transmitting portion 78, in the illustrated embodiment shown as a number of longitudinal slits 79 through plate 22, in registry with base 10 and bulb 62. It will be readily appreciated, however, that any manner of light transmitting means such as transparent or translucent material could be utilized in place of these slits. As will be seen upon inspection of Fig. 1, the area of the light transmitting portion 78 is relatively large in relation to the area of the cover plate 22, and provides for substantial illumination of the room immediately surrounding the plate 22.

It will thus be seen that the present invention provides an inexpensive and easily manufactured night-light and receptacle unit which may be received within any standard receptacle box, and which is wholly contained within the box with the exception of the switch control shaft 42 which normally projects outwardly of the cover plate no more than half an inch. In order to replace the bulb or remove the unit it is necessary only to remove screw 20 and plate 22 for access to the unit. While the switch 40 may be of any convenient type it has been found most practical to use the single push button type of switch rather than a rotary shaft type since the former provides greater ease of operation and eliminates the necessity of actually grasping the control shaft to operate the switch.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A combination night-light and receptacle unit for flush mounting in a standard electrical receptacle box comprising a base having such outer dimensions as to be wholly received within the receptacle box, means for supporting said base within the box, a boss extending upwardly from one end of said base and divided into complementary upper and lower portions, a socket in said boss received between said upper and lower portions thereof and opening on the side thereof facing the other end of said base for receiving an electric light bulb and supporting said bulb within the box, a switch received within said lower boss portion and having an operating member extending through said upper boss portion and outwardly thereof, contacts on said base for connection to an electrical supply, said contacts being connected to said socket through said switch to provide for lighting the bulb, said boss also including an electrical receptacle having a face portion raised slightly above said upper boss portion, said receptacle being wired to said contacts, a connecting member extending through said boss and engaging both said portions thereof to hold said boss portions together in operative relationship, the upper end of said connecting member having a threaded bore therein and being substantially flush with said upper boss portion, a plate covering said base and the surrounding receptacle box, and a screw extending through said plate and engaging said bore to hold said plate in position over the box, said plate having a light transmitting portion registering with said other end of said base, said plate also having a first aperture for passage of said operating member outwardly thereof and a second aperture receiving said receptacle face portion in substantially flush relationship with said plate.

2. In a combination night-light and receptacle unit adapted for mounting in a standard electrical receptacle box having an open face and slotted wings extending from opposite sides of the face the combination which comprises a base having such outer dimensions as to be wholly received within the receptacle box, parallel ridges extending across the bottom of said base substantially centrally thereof, a strap having a generally U-shaped central portion for embracing said base between said ridges, apertured wing portions at opposite ends of said strap center portion for registry with the wings on the box to support said base within the box substantially flush with the open face thereof, a boss extending upwardly from one end of said base and divided into complementary upper and lower portions, a socket in said boss received between said upper and lower portions thereof and opening on the side thereof facing the other end of said base for receiving an electric light bulb and supporting said bulb within the box, a switch received within said lower boss portion and having an operating member extending through said upper boss portion and outwardly thereof, contacts on said base for connection to an electrical supply, said contacts being connected to said socket through said switch to provide for lighting the bulb, said boss also including an electrical receptacle having a face portion raised slightly above said upper boss portion, said receptacle being wired to said contacts, a bolt extending through said boss and threadedly engaging said upper portion thereof to hold said boss portions together in operative relationship, the upper end of said bolt having a threaded bore therein and being substantially flush with, said upper boss portion, a plate covering said base and the surrounding receptacle box, and a screw extending through said plate and engaging said bore in said bolt to hold said plate in position over the box, said plate having a light transmitting portion registering with said other end of said base, and said plate also having a first aperture for passage of said operating member outwardly thereof and a second aperture receiving said receptacle face portion in substantially flush relationship with said plate.

3. In an electrical device adapted to be received within a standard receptacle box the combination of a base having such predetermined outer dimensions as to be received within a standard receptacle box and including a boss divided into complementary upper and lower portions, a socket in said boss opening on a side face thereof for receiving an electric light bulb and supporting the bulb within the receptacle box, a strap for supporting said base within the box, means interconnecting said strap and said boss portions, a switch in said boss including an operating member projecting from said upper portion thereof, a pair of contacts on said base for connection to an electrical power supply source, means connecting said contacts to said socket through said switch to provide for controlled lighting of the bulb, said boss also including an electric plug receptacle having a face portion raised above said upper boss portion, means connecting said receptacle to said contacts, a plate for covering said base and the surrounding receptacle box, said plate having a series of slits therein for registry with the portion of the receptacle box adjacent said socket to transmit substantially all of the light from the bulb to the exterior of the box, said plate also having a first aperture therethrough for passage of said operating member outwardly of said plate and [a second aperture therethrough for receiving said upstanding receptacle face portion in substantially flush relationship with said plate] *second aperture means providing for reception of an electrical plug in said receptacle,* and means engageable with said interconnecting means for removably securing said plate to said base.

*4. In an electrical device adapted to be received with-*

*in a standard receptacle box, the combination of a base having such predetermined outer dimensions as to be received within a standard receptacle box, said base having an upstanding portion adjacent one end thereof, a socket in said upstanding portion opening on a side face thereof for receiving an electric light bulb and supporting the bulb within a receptacle box, means defining an electric plug receptacle in the top surface of said upstanding portion, a switch on said upstanding portion including an operating member projecting above said top surface thereof, a pair of contacts on said base for connection to an electrical power supply source, means connecting said contacts to said receptacle, means connecting said contacts to said socket through said switch to provide for controlling lighting of the bulb, strap means for supporting said base within the box, means connecting said strap means and said base, a plate for covering said base and the surrounding receptacle box, said plate*

*having a light transmitting portion registering with the other end of said base opposite said upstanding portion, said plate having a first aperture therethrough for passage of said operating member outwardly of said plate and second aperture means for registry with said receptacle providing for reception of an electrical plug therein, and means removably securing said plate to said base.*

References Cited in the file of this patent or the original patent

UNITED STATES PATENTS

| | | |
|---|---|---|
| 1,101,376 | Abbott | June 23, 1914 |
| 1,694,158 | Both | Dec. 4, 1928 |
| 2,189,676 | Pfohl | Feb. 6, 1940 |
| 2,227,549 | McNeill | Jan. 7, 1941 |